(12) United States Patent
Yoon et al.

(10) Patent No.: US 8,691,448 B2
(45) Date of Patent: Apr. 8, 2014

(54) LITHIUM SECONDARY BATTERY WITH ANODE CONTAINING AQUEOUS BINDER

(75) Inventors: Su-Jin Yoon, Gyeonggi-do (KR); Sung-Hoon Yu, Gyeonggi-do (KR); Jong-Ho Jeon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/203,061

(22) PCT Filed: Feb. 26, 2010

(86) PCT No.: PCT/KR2010/001264
§ 371 (c)(1),
(2), (4) Date: Jan. 3, 2012

(87) PCT Pub. No.: WO2010/098638
PCT Pub. Date: Sep. 2, 2010

(65) Prior Publication Data
US 2012/0094191 A1   Apr. 19, 2012

(30) Foreign Application Priority Data

Feb. 26, 2009 (KR) .................. 10-2009-0016358
Feb. 26, 2010 (KR) .................. 10-2010-0017594

(51) Int. Cl.
*H01M 6/16* (2006.01)

(52) U.S. Cl.
USPC ........................................ 429/326; 429/331

(58) Field of Classification Search
USPC ....................................... 429/331
See application file for complete search history.

(56) References Cited

U.S. PATENT DOCUMENTS

| | | |
|---|---|---|
| 6,156,459 A | 12/2000 | Negoro et al. |
| 6,168,885 B1 | 1/2001 | Narang et al. |
| 6,991,874 B1 | 1/2006 | Mohwald et al. |
| 2003/0054259 A1 | 3/2003 | Murai et al. |
| 2005/0053843 A1 * | 3/2005 | Takahashi .................. 429/329 |
| 2007/0212615 A1 | 9/2007 | Jost et al. |
| 2007/0287070 A1 | 12/2007 | Okumura et al. |
| 2008/0318136 A1 * | 12/2008 | Amine et al. .............. 429/341 |
| 2009/0017386 A1 | 1/2009 | Xu et al. |
| 2009/0023066 A1 * | 1/2009 | Kojima et al. ............. 429/221 |

FOREIGN PATENT DOCUMENTS

| | | |
|---|---|---|
| EP | 0814523 A2 | 12/1997 |
| JP | 11-3728 | 1/1999 |
| JP | 2003151623 A | 5/2003 |
| KR | 20080053399 A | 6/2008 |

* cited by examiner

*Primary Examiner* — Ula C Ruddock
*Assistant Examiner* — Jacob Marks
(74) *Attorney, Agent, or Firm* — Lerner, David, Littenberg, Krumholz & Mentlik, LLP

(57) ABSTRACT

Provided is a lithium secondary battery comprising an anode, a cathode and a non-aqueous electrolyte, wherein the anode includes an aqueous binder, and the non-aqueous electrolyte contains (a) a cyclic anhydride or a derivative thereof; and (b) any one anion receptor selected from the group consisting of a borane compound, a borate compound and mixtures thereof. According to the present invention, a stable SEI film is formed on the anode, and the life characteristics of the battery are improved by controlling the LiF content in the SEI film.

8 Claims, 1 Drawing Sheet

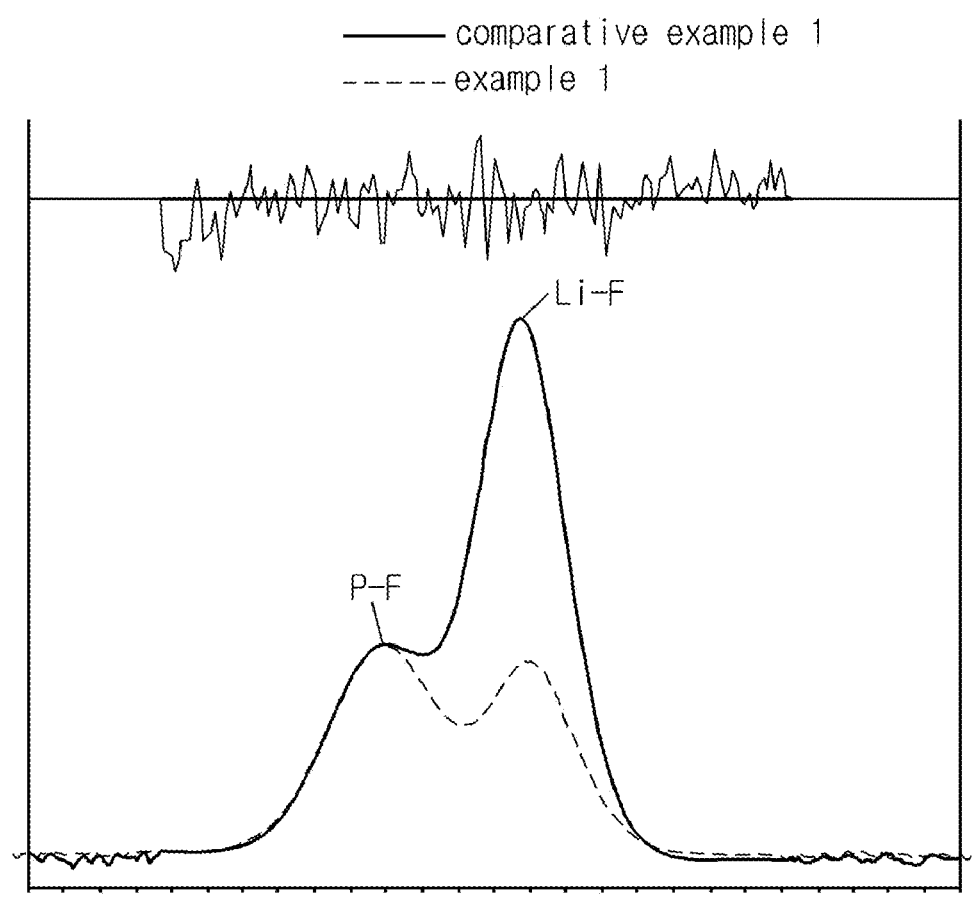

LITHIUM SECONDARY BATTERY WITH ANODE CONTAINING AQUEOUS BINDER

CROSS-REFERENCE TO RELATED APPLICATIONS

The present application is a national phase entry under 35 U.S.C. §371 of International Application No. PCT/K2010/001264 filed on Feb. 26, 2010, published in Korean, which claims priority from Korean Patent Application Nos. 10-2009-0016358 filed in Republic of Korea on Feb. 26, 2009 and 10-2010-0017594 filed in Republic of Korea on Feb. 26, 2010, the disclosures of which are incorporated herein by reference.

FIELD OF THE INVENTION

The present invention relates to a lithium secondary battery comprising an anode using an aqueous binder.

DESCRIPTION OF THE RELATED ART

Recently, interests in energy storage technologies have been increasing. As the application of the energy storage technologies is expanded to electronic appliances such as mobile phones, camcorders and notebook computers, and even to electric vehicles, the demand for high energy density batteries as a power source of the electronic appliances is high. A lithium ion secondary battery is one of the most satisfactory batteries, and numerous studies towards improvements are now in progress.

The lithium secondary battery comprises an anode, a cathode and a non-aqueous electrolyte interposed therebetween for providing a moving path of lithium ions, and it generates electric energy by oxidation and reduction reactions during intercalation and deintercalation of lithium ions at the anode and the cathode.

In the manufacture of the anode of the lithium secondary battery, a binder is used to bind active material particles so as to maintain a molded body, and includes a solvent-based binder (i.e. a binder using an organic solvent as a solvent), for example, polyvinylidene fluoride (PVdF), and an aqueous binder (i.e. a binder using water as a solvent), for example, styrene-butadiene rubber (hereinafter referred to as SBR).

The aqueous binder is more economical and environmental friendly and less harmful to health of workers than the solvent-based binder. Furthermore, the aqueous binder has a greater binding effect, and consequently, allows a higher ratio of an active material relative to equal volume than the solvent-based binder, resulting in high capacity. This leads to a recent vigorous use of the aqueous binder. However, as the lithium secondary battery gets charged and discharged repeatedly, disadvantageously its performance is deteriorated. This drawback becomes severer as the capacity density of the battery increases.

To solve the above-mentioned problems, methods have been suggested to form a solid electrolyte interface (SEI) film on the surface of the anode by adding various types of compounds to a non-aqueous electrolyte. But, further studies are still making progress to ensure an optimum non-aqueous electrolyte for a lithium secondary battery with an anode using an aqueous binder, so as to form a stable SEI film and remarkably improve the life characteristics of the battery.

DISCLOSURE

Technical Problem

Therefore, it is an object of the present invention to provide a lithium secondary battery comprising a non-aqueous electrolyte that contributes to a stable SEI film formed on an anode of the lithium secondary battery formed using an aqueous binder and improved life characteristics of the battery by controlling an amount of LiF in the SEI film.

Technical Solution

To achieve the object, provided is a lithium secondary battery comprising an anode, a cathode and a non-aqueous electrolyte according to the present invention, wherein the anode includes an aqueous binder, and the non-aqueous electrolyte contains (a) a cyclic anhydride or a derivative thereof; and (b) any one anion receptor selected from the group consisting of a borane compound, a borate compound, and mixtures thereof.

In the lithium secondary battery of the present invention, the aqueous binder is preferably styrene-butadiene rubber (SBR).

And, in the lithium secondary battery of the present invention, the cyclic anhydride or derivative thereof is preferably any one selected from the group consisting of compounds represented by the following formulae 1 to 4, or mixtures thereof:

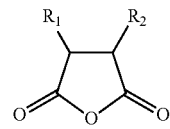

Formula 1

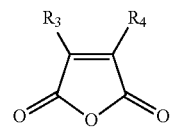

Formula 2

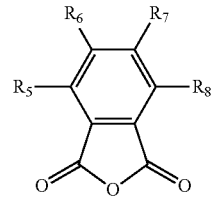

Formula 3

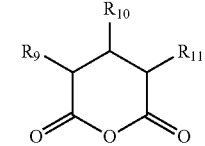

Formula 4

In the above formulae 1 to 4, each of $R_1$ to $R_{11}$ is independently halogen, or an alkyl group, an alkenyl group or an alkoxy group having 1 to 10 carbon atoms, substituted or non-substituted with halogen.

And, in the lithium secondary battery of the present invention, the borane compound is preferably a compound represented by the following formula 5, and the borate compound is preferably a compound represented by the following formula 6.

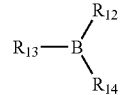

Formula 5 where each of $R_{12}$ to $R_{14}$ is independently hydrogen or halogen, or an alkyl group or a silyl group having 1 to 6 carbon atoms.

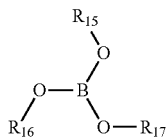

Formula 6 where each of $R_{15}$ to $R_{17}$ is independently hydrogen or halogen, or an alkyl group or a silyl group having 1 to 6 carbon atoms.

In the lithium secondary battery of the present invention, the content of each of the (a) and (b) components is between 0.05 and 10 weight % per the total weight of the non-aqueous electrolyte.

Effects of the Invention

The lithium secondary battery according to the present invention has the following effects:

First, the use of an aqueous binder as an anode binder improves economical efficiency and environmental friendliness. And, the aqueous binder has a larger binding effect, and consequently allows a higher ratio of an anode active material relative to equal volume than a solvent-based binder, thereby ensuring high capacity.

Secondly, a cyclic anhydride or a derivative thereof contained in a non-aqueous electrolyte forms a stable SEI film on the surface of an anode. And, an anion receptor of a borane compound or a borate compound controls the LiF content in the SEI film by migrating LiF from the SEI film because of the increased LiF content in the SEI film caused by the presence of an aqueous binder and a cyclic anhydride (or a derivative thereof). As a result, the resistance of the SEI film is controlled and the life characteristics of the battery are improved.

DESCRIPTION OF DRAWINGS

FIG. 1 is an X-ray photoelectron spectroscopy (XPS) graph of the surface of an anode of each battery according to example 1 and comparative example 1 after charging at 0.1 C.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The present invention provides a lithium secondary battery comprising an anode, a cathode and a non-aqueous electrolyte, wherein the anode includes an aqueous binder, and the non-aqueous electrolyte contains (a) a cyclic anhydride or a derivative thereof; and (b) any one anion receptor selected from the group consisting of a borane compound, a borate compound, and mixtures thereof.

As mentioned above, the lithium secondary battery of the present invention uses an aqueous binder as an anode binder, and thus, it is manufactured economically and environmentally friendly. And, when compared with a solvent-based binder, the aqueous binder has a larger binding effect, and consequently allows a higher ratio of an anode active material relative to equal volume, thereby ensuring high capacity. Preferably, the aqueous binder is styrene-butadiene rubber (SBR), and may be dispersed in water together with a thickening agent such as carboxymethyl cellulose (CMC), and then applied to an anode, as known in the art.

And, in the lithium secondary battery of the present invention, the non-aqueous electrolyte contains (a) a cyclic anhydride or a derivative thereof. During initial charging, the cyclic anhydride or derivative thereof effects a ring-opening reaction at a lower potential than a solvent to form an SEI film on the surface of an anode.

Preferably, the cyclic anhydride or derivative thereof is any one selected from the group consisting of compounds represented by the following formulae 1 to 4, or mixtures thereof:

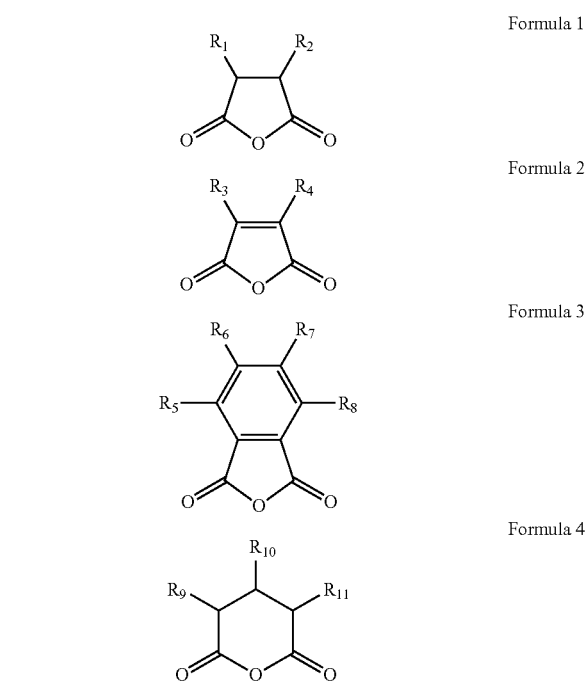

In the above formulae 1 to 4, each of $R_1$ to $R_{11}$ is independently halogen, or an alkyl group, an alkenyl group or an alkoxy group having 1 to 10 carbon atoms, substituted or non-substituted with halogen.

The SEI film formed from the above-mentioned (a) component has high stability, but contains a large amount of LiF therein, which acts as a large resistance during charging/discharging. A significant increase in LiF content in the SEI film is resulted from the use of an aqueous binder as an anode binder, as well as the use of (a) component. That is, an anode using an aqueous binder has a higher water content, when compared with an anode using a solvent-based binder such as polyvinylidene fluoride (PVdF). As a result, the hydrofluoric acid (HF) content in the non-aqueous electrolyte increases remarkably, and consequently, an amount of LiF increases when an SEI film is formed from the (a) component.

To solve the problem, the lithium secondary battery of the present invention uses any one anion receptor selected from the group consisting of a borane compound, a borate compound, and mixtures thereof. In other words, an anion receptor of a borane compound or a borate compound contained in the non-aqueous electrolyte enables migration of LiF in the SEI film because of the increased LiF content in the SEI film caused by the presence of the aqueous binder and the cyclic anhydride (or derivative thereof). As a result, the LiF content in the SEI film is lowered and the resistance of the SEI film is reduced, thereby improving the life characteristics of the battery.

In the lithium secondary battery of the present invention, it is preferred to use a compound represented by the following formula 5 as the borane compound contained in the non-aqueous electrolyte, and a compound represented by the following formula 6 as the borate compound.

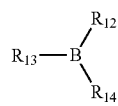

Formula 5 where each of $R_{12}$ to $R_{14}$ is independently hydrogen or halogen, or an alkyl group or a silyl group having 1 to 6 carbon atoms.

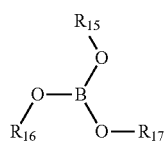

Formula 6 where each of $R_{15}$ to $R_{17}$ is independently hydrogen or halogen, or an alkyl group or a silyl group having 1 to 6 carbon atoms.

To improve the life characteristics and performance of the battery, it is preferred to control the content of each of the (a) and (b) components between 0.05 and 10 weight % per the total weight of the non-aqueous electrolyte.

In the lithium secondary battery of the present invention, the non-aqueous electrolyte contains an organic solvent. The organic solvent is not limited to a particular type of organic solvent if it is a typical organic solvent for a non-aqueous electrolyte. For example, the organic solvent may be cyclic carbonate, linear carbonate, lactone, ether, ester, acetonitrile, lactam and/or ketone.

For example, the cyclic carbonate may be ethylene carbonate (EC), propylene carbonate (PC), butylene carbonate (BC), fluoroethylene carbonate (FEC), and so on, and the linear carbonate may be diethyl carbonate (DEC), dimethyl carbonate (DMC), dipropyl carbonate (DPC), ethyl methyl carbonate (EMC), methyl propyl carbonate (MPC), and so on. The exemplary carbonates may be used singularly or in combination. And, the lactone may be, for examples, γ-butyrolactone (GBL), and the ether may be dibutyl ether, tetrahydrofuran, 2-methyltetrahydrofuran, 1,4-dioxane, 1,2-dimethoxyethane, 1,2-diethoxyethane, and so on. The ester may be, for example, methyl formate, ethyl formate, propyl formate, methyl acetate, ethyl acetate, propyl acetate, methyl propionate, ethyl propionate, butyl propionate, methyl pivalate, and so on. And, the lactam may be, for example, N-methyl-2-pyrrolidone (NMP) and so on, and the ketone may be polymethylvinyl ketone. Also, halogen derivatives of the exemplary organic solvents may be used, however the present invention is not limited in this regard. These organic solvents may be used singularly or in combination.

In the lithium secondary battery of the present invention, the non-aqueous electrolyte contains an electrolyte salt, and the electrolyte salt is not limited to a particular type of electrolyte salt if it is a typical electrolyte salt for a non-aqueous electrolyte.

The electrolyte salt may be a mixture of (i) a cation selected from the group consisting of $Li^+$, $Na^+$, and $K^+$, and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, however the present invention is not limited in this regard. These exemplary electrolyte salts may be used singularly or in combination. Preferably, the electrolyte salt may be a lithium salt, for example, $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, and so on.

Meanwhile, the lithium secondary battery of the present invention includes all of typical lithium secondary batteries, for example, a lithium metal secondary battery, a lithium ion secondary battery, a lithium polymer secondary battery, a lithium ion polymer secondary battery, and so on.

The lithium secondary battery of the present invention may be manufactured by a typical method known in the art. For example, the lithium secondary battery may be manufactured by placing an anode and a cathode with a porous separator interposed therebetween, and filling with a non-aqueous electrolyte.

An electrode of the lithium secondary battery may be produced by a typical method known in the art. For example, the electrode may be produced by mixing an electrode active material with a solvent, and if necessary, a binder, a conductive material and a dispersant, and agitating the mixture to prepare a slurry, and applying (coating) the slurry to a current collector made of a metal material, followed by compression and drying.

A cathode active material may be, for example, a lithium transition metal composite oxide such as $LiM_xO_y$ (M=Co, Ni, Mn, or $CO_aNi_bMn_c$, for example, lithium manganese composite oxide such as $LiMn_2O_4$, lithium nickel oxide such as $LiNiO_2$, lithium cobalt oxide such as $LiCoO_2$, any material obtained by substituting a portion of the manganese, nickel or cobalt of these exemplary oxides with another transition metal, vanadium oxide containing lithium, or the like), and so on, however the present invention is not limited in this regard.

An anode active material may be a typical anode active material usable for an anode of a conventional lithium secondary battery. For example, the anode active material may be lithium metals, lithium alloys, carbon, petroleum coke, activated carbon, graphite, carbon fiber, and so on, that is capable of intercalating and deintercalating lithium ions. In addition, the anode active material may be metal oxides, such as $TiO_2$, $SnO_2$ and so on, that are capable of intercalating and deintercalating lithium and have the potential less than 2V against lithium, however the present invention is not limited in this regard. In particular, a carbon material such as graphite, carbon fiber or activated carbon is preferred.

In the current collector of a metal material, the metal material has high conductivity, and it is not limited to a particular type of metal as long as it allows easy adhesion of the electrode active material slurry thereto and has no reactivity within a voltage range of the battery. For example, a metal material of a cathode current collector may be a foil made of aluminum, nickel or any combination thereof, and a metal material of an anode current collector may be a foil made of copper, gold, nickel, copper alloys or any combination thereof.

For example, an available cathode binder may be polytetrafluoroethylene (PTFE), polyvinylidene fluoride (PVdF) and so on, and an available anode binder may be styrene-butadiene copolymer (SBR).

The conductive material is not limited to a particular type of conductive material as long as it is an electrical conductive material without any chemical change in an electrochemical device. Typically, the conductive material may be carbon black, graphite, carbon fiber, carbon nanotubes, metal powder, conductive metal oxides, organic conductive materials and so on. Currently, conductive materials on the market are, for example, Acetylene Black series (available from Chevron Chemical Company or Gulf Oil Company), Ketjen Black EC series (available from Armak Company), Vulcan XC-72 (available from Cabot Company), Super P (available from MMM), and so on.

The solvent for producing an electrode may be, for example, water, or an organic solvent such as NMP (N-methylpyrrolidone), DMF (dimethylformamide), acetone, dimethyl acetamide, and so on. These exemplary solvents may be used singularly or in combination. In the case of an anode, water is preferred. It is sufficient that the solvent is used in such an amount as to dissolve and disperse an electrode active material, a binder and a conductive material, in consideration of a coating thickness of a slurry and a manufacturing yield.

The lithium secondary battery of the present invention may comprise a separator. The separator is not limited to a particular type of separator, but a porous separator is preferred. For example, the separator is a polypropylene-based, polyethylene-based or polyolefin-based porous separator, and so on.

The lithium secondary battery of the present invention may have a case of various shapes including, but not limited to, a cylindrical shape, a prismatic shape, a pouch shape, a coin shape, and so on.

MODE FOR THE INVENTION

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

Preparation of Non-Aqueous Electrolyte

1M LiPF$_6$ was dissolved in an organic solvent having ethylene carbonate (EC):ethylmethyl carbonate (EMC)=3:7 (v:v) to prepare a non-aqueous electrolyte, and 0.5 weight % of succinic anhydride represented by the following formula 7 and 0.1 weight % of tripropyl borate were added thereto per the total weight of the non-aqueous electrolyte.

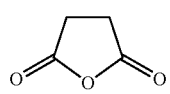

Formula 7

Manufacture of Lithium Secondary Battery

A pouch-shaped bi-cell is manufactured by a typical method comprising: producing an electrode using LiCoO$_2$ as a cathode, artificial graphite as an anode, and SBR as an anode binder; and filling with the non-aqueous electrolyte prepared as mentioned above.

Example 2

A non-aqueous electrolyte and a lithium secondary battery were manufactured in the same way as Example 1, except that tripropyl borane was used instead of tripropyl borate.

Example 3

A non-aqueous electrolyte and a lithium secondary battery were manufactured in the same way as Example 1, except that 1 weight % of fluoroethylene carbonate represented by the following formula 8 was further added.

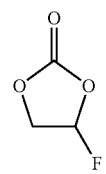

Formula 8

Example 4

A non-aqueous electrolyte and a lithium secondary battery were manufactured in the same way as Example 1, except that tris(trimethyl silyl) borate was used instead of tripropyl borate.

Example 5

A non-aqueous electrolyte and a lithium secondary battery were manufactured in the same way as Example 1, except that maleic anhydride was used instead of succinic anhydride.

Example 6

A non-aqueous electrolyte and a lithium secondary battery were manufactured in the same way as Example 1, except that phthalic anhydride was used instead of succinic anhydride.

Comparative Example 1

A non-aqueous electrolyte and a lithium secondary battery were manufactured in the same way as Example 1, except that tripropyl borate was not added.

Comparative Example 2

A non-aqueous electrolyte and a lithium secondary battery were manufactured in the same way as Example 3, except that tripropyl borate was not added.

Comparative Example 3

A non-aqueous electrolyte and a lithium secondary battery were manufactured in the same way as Example 1, except that succinic anhydride was not added.

Comparative Example 4

A non-aqueous electrolyte and a lithium secondary battery were manufactured in the same way as Example 2, except that succinic anhydride was not added.

Comparative Example 5

A non-aqueous electrolyte and a lithium secondary battery were manufactured in the same way as Example 4, except that succinic anhydride was not added.

Comparative Example 6

A non-aqueous electrolyte and a lithium secondary battery were manufactured in the same way as Example 5, except that tripropyl borate was not added.

Comparative Example 7

A non-aqueous electrolyte and a lithium secondary battery were manufactured in the same way as Example 6, except that tripropyl borate was not added.

Comparative example 8

A non-aqueous electrolyte and a lithium secondary battery were manufactured in the same way as Example 1, except that succinic anhydride and tripropyl borate were not added.

Comparative Example 9

A non-aqueous electrolyte and a lithium secondary battery were manufactured in the same way as Example 1, except that PVdF was used as an anode binder instead of SBR.

Evaluation of Life Characteristics

The pouch-shaped bi-cells of examples 1 to 6 and comparative examples 1 to 9 were charged and discharged at 0.5 C 200 cycles, and capacity retention ratios were measured relative to initial capacity. The results are shown in the following table 1.

TABLE 1

| | Additives | Capacity retention ratio after 200 cycles charging/discharging (%) |
|---|---|---|
| Example 1 | Succinic anhydride 0.5 wt % tripropyl borate 0.1 wt % | 85.7 |
| Example 2 | Succinic anhydride 0.5 wt % tripropyl borane 0.1 wt % | 82.7 |
| Example 3 | Succinic anhydride 0.5 wt % Fluoro-ethylene carbonate 1 wt % tripropyl borate 0.1 wt % | 86.3 |
| Example 4 | Succinic anhydride 0.5 wt % Tris(trimethyl silyl) borate 0.1 wt % | 81.3 |
| Example 5 | Maleic anhydride 0.5 wt % tripropyl borate 0.1 wt % | 77.8 |
| Example 6 | Phthalic anhydride 0.5 wt % tripropyl borate 0.1 wt % | 72.7 |
| Comparative example 1 | Succinic anhydride 0.5 wt % | 62.3 |
| Comparative example 2 | Succinic anhydride 0.5 wt % Fluoro-ethylene carbonate 1 wt % | 65.6 |
| Comparative example 3 | tripropyl borate 0.1 wt % | 65.9 |
| Comparative example 4 | tripropyl borane 0.1 wt % | 62.2 |
| Comparative example 5 | Tris(trimethyl silyl) borate 0.1 wt % | 60.5 |
| Comparative example 6 | Maleic anhydride 0.5 wt % | 52.4 |
| Comparative example 7 | Phthalic anhydride 0.5 wt % | 44.3 |
| Comparative example 8 | none | 51.2 |
| Comparative example 9 | Succinic anhydride 0.5 wt % tripropyl borate 0.1 wt % (anode binder: PVdF) | 26.1 |

As seen in the above table 1, it is found that in the case of a lithium secondary battery with an anode using an aqueous binder, the use of a non-aqueous electrolyte containing both a cyclic anhydride derivative and an anion receptor improves the life characteristics dramatically, when compared with the use of a non-aqueous electrolyte containing either a cyclic anhydride derivative or an anion receptor, or none of them.

Meanwhile, it is found that the lithium secondary battery of comparative example 9, in which the non-aqueous electrolyte of the present invention is applied, but a solvent-based binder, PVdF is used as an anode binder, has a great deterioration in life characteristics. As an anode formed using a solvent-based binder has a specific surface area lower than an anode formed using an aqueous binder, it is presumed that this result is caused by an increase in resistance per unit area due to two additives of the present invention.

Evaluation of LiF Content in SEI film

After the bi-cells of example 1 and comparative example 1 were charged and discharged at 0.1 C, surface analysis was performed on the removed anodes using XPS. The results are shown in FIG. 1.

Referring to FIG. 1, it is found that in the case of a lithium secondary battery with an anode using as an aqueous binder, the use of a non-aqueous electrolyte containing both a cyclic anhydride derivative and an anion receptor according to example 1 reduced the LiF content in the SEI film significantly, when compared with the use of a non-aqueous electrolyte containing a cyclic anhydride derivative singularly. This is because an anion receptor enables migration of LiF from the SEI film formed on the surface of the anode, thereby facilitating charging/discharging.

What is claimed is:

1. A lithium secondary battery comprising an anode, a cathode and a non-aqueous electrolyte,
    wherein the anode includes an aqueous binder, wherein the aqueous binder is styrene-butadiene rubber (SBR), and
    wherein the non-aqueous electrolyte comprises:
    (a) a cyclic anhydride; and
    (b) any one anion receptor selected from the group consisting of a borane compound, a borate compound, and mixtures thereof.

2. The lithium secondary battery according to claim 1, wherein the cyclic anhydride is any one selected from the group consisting of compounds represented by the following formulae 1 to 4, and mixtures thereof:

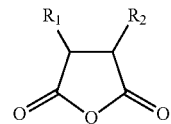

Formula 1

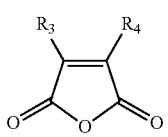

Formula 2

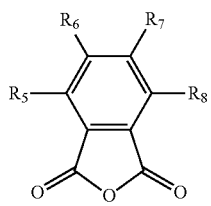

Formula 3

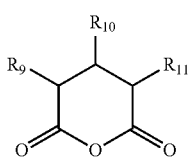

Formula 4 where each of $R_1$ to $R_{11}$ is independently halogen, or an alkyl group, an alkenyl group or an alkoxy group having 1 to 10 carbon atoms, substituted or non-substituted with halogen.

3. The lithium secondary battery according to claim 1, wherein the borane compound is a compound represented by the following formula 5:

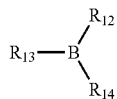

Formula 5 where each of $R_{12}$ to $R_{14}$ is independently hydrogen or halogen, or an alkyl group or a silyl group having 1 to 6 carbon atoms.

4. The lithium secondary battery according to claim 1, wherein the borate compound is a compound represented by the following formula 6:

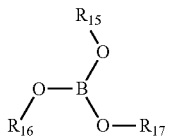

Formula 6 where each of $R_{15}$ to $R_{17}$ is independently hydrogen or halogen, or an alkyl group or a silyl group having 1 to 6 carbon atoms.

5. The lithium secondary battery according to claim 1, wherein the content of each of the (a) and (b) components is between 0.05 and 10 weight % per the total weight of the non-aqueous electrolyte.

6. The lithium secondary battery according to claim 1, wherein the non-aqueous electrolyte contains a lithium salt and a carbonate organic solvent.

7. The lithium secondary battery according to claim 6, wherein the lithium salt is any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, and mixtures thereof.

8. The lithium secondary battery according to claim 6, wherein the carbonate organic solvent is a cyclic carbonate selected from the group consisting of ethylene carbonate, propylene carbonate, butylene carbonate and fluoroethylene carbonate, a linear carbonate selected from the group consisting of diethyl carbonate, dimethyl carbonate, ethyl methyl carbonate, dipropyl carbonate, methyl propyl carbonate, and mixtures thereof.

* * * * *